United States Patent
Kirsch

(10) Patent No.: US 8,006,067 B2
(45) Date of Patent: Aug. 23, 2011

(54) FLEXIBLE RESULTS PIPELINE FOR PROCESSING ELEMENT

(75) Inventor: Graham Kirsch, Tadley (GB)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/621,400

(22) Filed: Nov. 18, 2009

(65) Prior Publication Data

US 2010/0070738 A1    Mar. 18, 2010

Related U.S. Application Data

(63) Continuation of application No. 10/442,667, filed on May 20, 2003, now Pat. No. 7,627,737.

(30) Foreign Application Priority Data

Sep. 17, 2002 (GB) .................................. 0221560.6

(51) Int. Cl.
G06F 15/00 (2006.01)
G06F 15/76 (2006.01)

(52) U.S. Cl. ......................................................... 712/15
(58) Field of Classification Search ...................... 712/15
See application file for complete search history.

(56) References Cited

U.S. PATENT DOCUMENTS

| | | | | |
|---|---|---|---|---|
| 4,215,401 A | * | 7/1980 | Holsztynski et al. | 382/304 |
| 4,739,476 A | * | 4/1988 | Fiduccia | 712/22 |
| 4,816,993 A | * | 3/1989 | Takahashi et al. | 712/28 |
| 4,829,460 A | | 5/1989 | Ito | 708/209 |
| 4,868,739 A | * | 9/1989 | Ngai et al. | 712/203 |
| 4,872,111 A | * | 10/1989 | Daberkow et al. | 711/140 |
| 4,884,190 A | * | 11/1989 | Ngai et al. | 712/4 |
| 4,884,193 A | * | 11/1989 | Lang | 712/18 |
| 4,888,682 A | * | 12/1989 | Ngai et al. | 712/4 |
| 5,121,429 A | * | 6/1992 | Guppy et al. | 380/30 |
| 5,268,856 A | * | 12/1993 | Wilson | 708/514 |
| 5,361,367 A | | 11/1994 | Fijany et al. | 395/800 |
| 5,522,085 A | | 5/1996 | Harrison et al. | 395/800 |
| 5,659,780 A | * | 8/1997 | Wu | 712/19 |
| 5,838,939 A | * | 11/1998 | Sutherland | 712/200 |
| 5,887,160 A | | 3/1999 | Lauritzen et al. | 395/563 |
| 6,049,860 A | * | 4/2000 | Krygowski et al. | 712/25 |
| 6,128,720 A | | 10/2000 | Pechanek et al. | 712/20 |

(Continued)

FOREIGN PATENT DOCUMENTS

| | | |
|---|---|---|
| EP | 0 726 529 A3 | 3/1997 |
| EP | 0 726 532 A3 | 3/1997 |
| GB | 2 203 574 A | 10/1988 |

OTHER PUBLICATIONS

Hennessy, John L., et al., "*Computer Organization and Design: The hardware/Software Interface*", 2nd Edition, 1997. The D Latch at http://www.play-hookey.com/digital/d_nand_latch.html.

*Primary Examiner* — Aimee J Li
(74) *Attorney, Agent, or Firm* — Dorsey + Whitney LLP

(57) ABSTRACT

A flexible results pipeline for a processing element of a parallel processor is described. A plurality of result registers are selectively connected to each other, to processing logic of the processing element and to a neighborhood connection register configured to receive data from and send data to other processing elements. The connections between the result registers and between the result registers and the neighborhood connection register are selectively configurable by applied control signals.

18 Claims, 3 Drawing Sheets

U.S. PATENT DOCUMENTS

| | | | |
|---|---|---|---|
| 6,360,189 B1 | 3/2002 | Hinds et al. | 703/2 |
| 6,587,941 B1 | 7/2003 | Flacks et al. | 712/218 |
| 6,615,333 B1 | 9/2003 | Hoogerbrugge et al. | 711/169 |
| 6,889,317 B2 | 5/2005 | Sami et al. | 712/218 |
| 2003/0065904 A1* | 4/2003 | Burns et al. | 712/11 |
| 2004/0003201 A1* | 1/2004 | Burns et al. | 712/11 |

* cited by examiner

FLEXIBLE RESULTS PIPELINE FOR PROCESSING ELEMENT

CROSS-REFERENCE TO RELATED APPLICATIONS

This application is a continuation of U.S. patent application Ser. No. 10/442,667, filed May 20, 2003, which claims priority from UK Application No. 0221560.6, filed Sep. 17, 2002. This applications are incorporated by reference herein in their entirety and for all purposes.

FIELD OF THE INVENTION

The present invention relates to a transferring data between components of a processing element in a parallel processor. More particularly, the present invention relates transferring data between processing logic in the processing element and the inputs and outputs of the processing element.

BACKGROUND TO THE INVENTION

A simple computer generally includes a central processing unit (CPU) and a main memory. The CPU implements a sequence of operations encoded in a stored program. The program and data on which the CPU acts is typically stored in the main memory. The processing of the program and the allocation of main memory and other resources are controlled by an operating system. In operating systems where multiple applications may share and partition resources, the processing performance of the computer can be improved through use of active memory.

Active memory is memory that processes data as well as storing it. It can be instructed to operate on its contents without transferring its contents to the CPU or to any other part of the system. This is typically achieved by distributing parallel processors throughout the memory. Each parallel processor is connected to the memory and operates on it independently of the others. Most of the data processing is performed within the active memory and the work of the CPU is thus reduced to the operating system tasks of scheduling processes and allocating system resources.

A block of active memory typically consists of the following: a block of memory, e.g. dynamic random access memory (DRAM), an interconnection block, and a memory processor (processing element array). The interconnection block provides a path that allows data to flow between the block of memory and the processing element array. The processing element array typically includes multiple identical processing elements controlled by a sequencer. Processing elements are generally small in area, have a low degree of hardware complexity, and are quick to implement, which leads to increased optimisation. Processing elements are usually designed to balance performance and cost. A simple more general-purpose processing element will result in a higher level of performance than a more complex processing element because it can be easily coupled to generate many identical processing elements. Further, because of its simplicity, the processing element will clock at a faster rate.

In any computer system, it is important that data is processed efficiently in order to maximise the speed of the processor. In a parallel processor containing a plurality of processing elements, it is important to maximise the speed of movement of data from an input to the processing element through processing logic to an output of the processing element.

Moreover, it is important to ensure that data generated by one part of the processing element is ready use by another part or by another processing element as and when it is required.

In a parallel processor, in which there is a plurality of processing elements, in addition to transferring data between a particular processing element and its memory or host CPU, often data is transferred between the individual processing elements. This added complexity further increases the complexity of inputting and outputting data from the processing element and can further reduce the speed of the processing element.

Accordingly, it is an object of the present invention to provide efficient scheduling and transfer of data within the processing element.

It is a further object of the present invention to provide a more flexible processing element, within which data can be efficiently transferred between components of the processing element.

It is yet a further object of the present invention to provide faster transfer out of the processing element of results of processing operations occurring therein.

SUMMARY OF THE INVENTION

Accordingly, the present invention provides a processing element for a parallel processor comprising:
processing logic; and
a plurality of result registers selectively connected to each other;
wherein:
at least one of the result registers is selectively connected to receive data from the processing logic;
at least one of the result registers is selectively connected to send data to the processing logic; and
the connections between the result registers are selectively configurable by applied control signals.

Preferably, the processing element further comprises:
a neighbourhood connection register configured to receive data from and send data to other processing elements in the device;
wherein:
the neighbourhood connection register is selectively connected to receive data from at least one of the result registers;
the neighbourhood connection register is selectively connected to send data to at least one of the result registers; and
the connections between the result registers and the neighbourhood connection register are selectively configurable by applied control signals.

Thus, the length and configuration of the result register pipeline can be changed. This provides for more flexible processing of data. Moreover, the position of the neighbourhood connection register in a chain comprising result registers and the neighbourhood connection register can be changed. This provides for more efficient and flexible transfer of data between the neighbourhood connection register and the processing logic (i.e. inputting of operands into the processing logic received from neighbouring processing elements or outputting results of the processing operations to neighbouring processing elements).

In one embodiment of the present invention, the processing element further comprises a register file configured to transfer data between the processing element and memory and/or a host connected to the device, wherein at least one of the result registers is selectively connected to receive data from the register file and at least one of the result registers is selectively connected to send data to the register file.

In another embodiment, the neighbourhood connection register is selectively connected to receive data from its own output. This way, the neighbourhood connection register can be used to store data between data transfers in the processing element.

Preferably, the processing element further comprises:
a control circuit which receives and decodes control commands transmitted to the processing element and generates the control signals;
at the input to each result register and the neighbourhood connection register, a selection circuit connected to the control logic for selecting the input to each result register and the neighbourhood connection register according to the control signals.

Preferably, the selection circuit is a multiplexer.

Preferably, the configuration of the connections between the result registers and the neighbourhood connection registers can be set such that data enters the result registers from different portions of the processing logic, enabling pipelining of processing operations in the processing logic.

Advantageously, pipelining allows results of operations from certain portions of the processing logic, which are complete before operations from other portions, to be output from the processing element. This increases the speed at which data can be output from the processing element. In addition, results which are available before other results can be easily fed back into the processing logic, thereby increasing the speed of the processing operations. Alternatively, results may be delayed until other results with which they are to be combined become available.

In a second aspect of the present invention, there is provided a method of configuring a processing element for a parallel processor, in which there is provided processing logic and a plurality of result registers, at least one of which is connected to the processing logic comprising the steps of:
receiving control signals from a control circuit in the processing element; and
changing the configuration of the connections between the result registers accordingly.

In a third aspect of the present invention, there is provided a method of transferring data in a processing element for an active memory device, in which there is provided processing logic, a plurality of result registers, at least one of which is connected to the processing logic and at least one of which is connected to another a neighbourhood connection register configured to receive data from and send data to other processing elements in the device and connected to at least one of the result registers comprising the steps of:
(a) transferring data between the processing logic and the at least one result register connected to the processing logic;
(b) transferring data between the at least one result register connected to the neighbourhood result register and the neighbourhood connection register; and
(c) changing the configuration of the connections between the neighbourhood connection register and the result registers.

Preferably, the method further comprises the step of repeating steps (a) to (c).

BRIEF DESCRIPTION OF THE DRAWINGS

A specific embodiment will now be described by way of example only and with reference to the accompanying drawings, in which.

DETAILED DESCRIPTION

Figure 1:
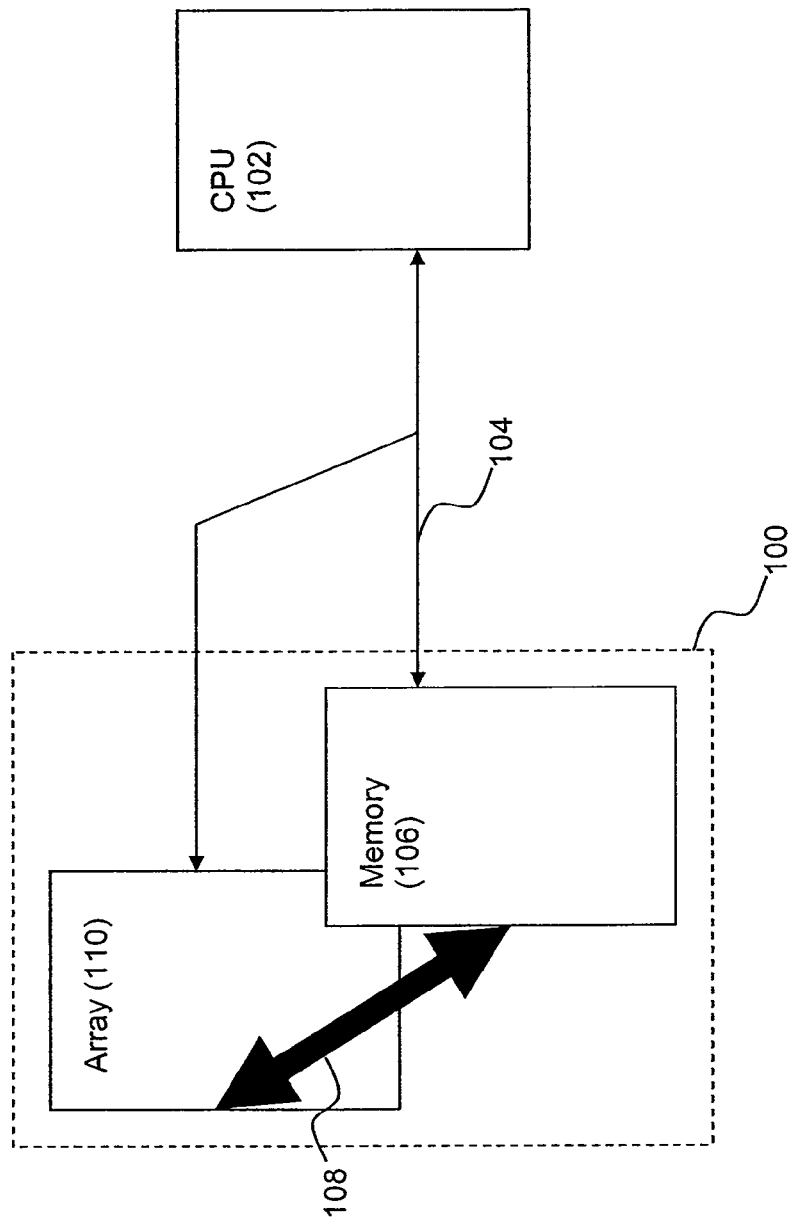
FIG. 1 shows one embodiment of an active memory block in accordance with the present invention.

Referring to FIG. 1, one embodiment of an active memory block in accordance with the invention is shown. Active memory block 100 includes a memory 106 and an array 110 of processing elements. Memory 106 is preferably random access memory (RAM), in particular dynamic RAM (DRAM). The array 110 can communicate with memory 106 via an interconnection block 108. The interconnection block 108 can be any suitable communications path, such as a bi-directional high memory bandwidth path. A central processing unit (CPU) 102 can communicate with active memory block 100 via a communications path 104. The communications path 104 may be any suitable bi-directional path capable of transmitting data.

Figure 2:
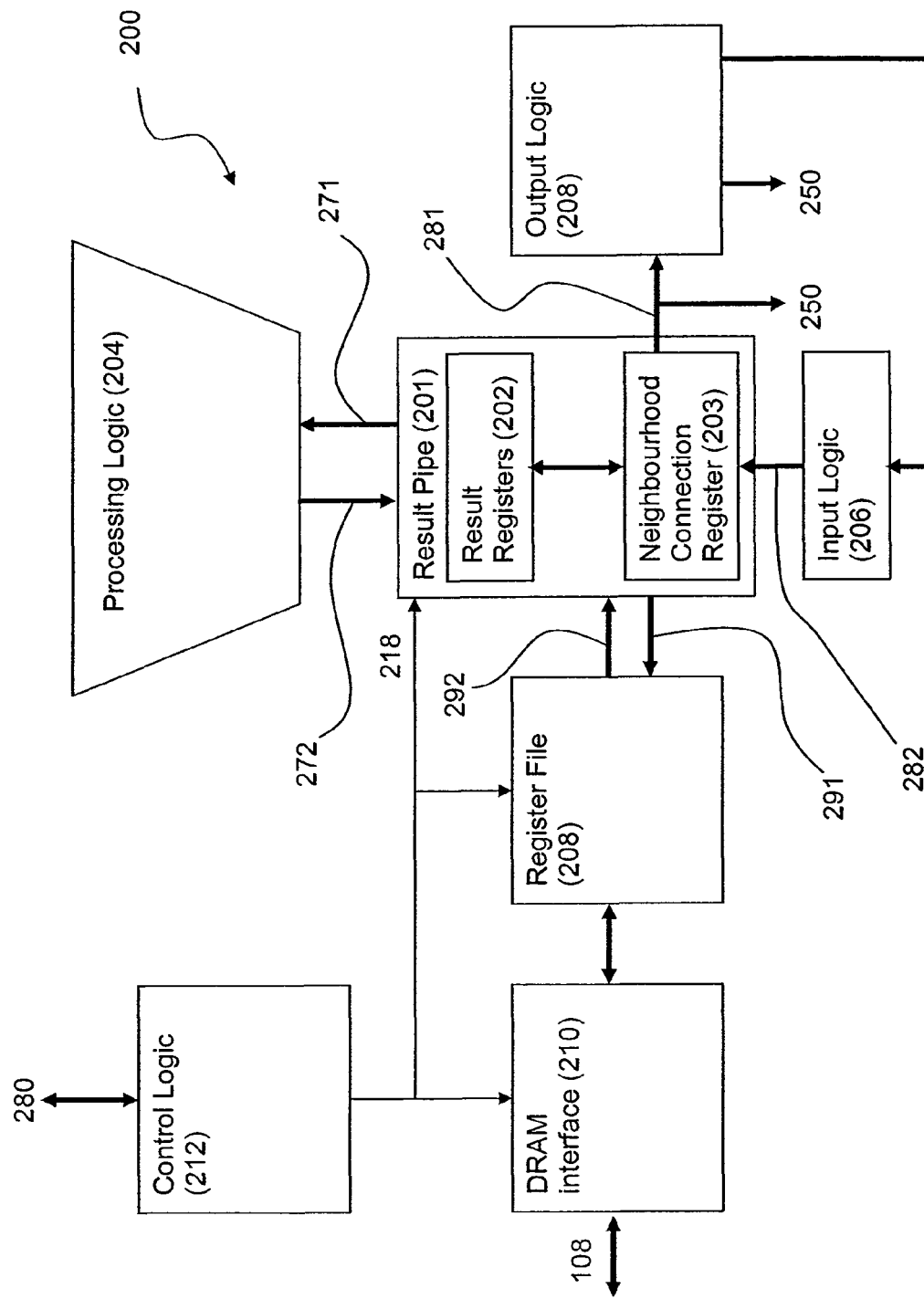
FIG. 2 shows one embodiment of the components interconnections of a processing element of the present invention.

Referring to FIG. 2, the components of one of a number of a processing elements 200 forming the array 110 are shown. The processing element 200 includes processing logic 204, a result pipe 201 including result registers 202 and a neighbourhood connection register 203. The result pipe 201 is connected to a DRAM interface 210 via a register file 208. Data is passed between the memory 106 and the processing element 200 via the DRAM interface 210 and the register file 208. Data is passed from the result registers 202 to the processing logic 204 to be processed. The processing logic 204 passes the results of processing back to the result registers 202. Data from neighbouring processing elements 250 is received via input logic 206 into the neighbourhood connection register 203. Data is output to neighbouring processing elements 250 directly from the neighbourhood connection register 203 or from output logic 208 which may combine the data being output with data from other neighbouring processing elements 250.

The processing logic 204 may comprise a number of different portions (not shown) into which data can be input and data can be output separately. These portions can include an arithmetic logic unit, a corresponding logical unit, shift control registers, condition registers and data shifting blocks.

Control logic 212 is connected to the DRAM interface 210, the register file 208 and the result pipe 201. The control logic 212 receives control commands sent to all of the processing elements in the array 110 and generates control signals 218 which are sent to the result pipe 201 to configure the connections between the result registers 202, the neighbourhood connection register 203 and the components connected to them, i.e. the register file 208, processing logic 204, output logic 208 and input logic 206.

The result pipe is connected to the processing logic 204 via processing logic output and input interconnects 271, 272, to the register file 208 via register file output and input interconnects 291, 292, to the output logic via output interconnect 281, and to the input logic via input interconnect 282. The interconnects are 8-bit (byte) wide data wires between the components of the processing element 200.

Figure 3:
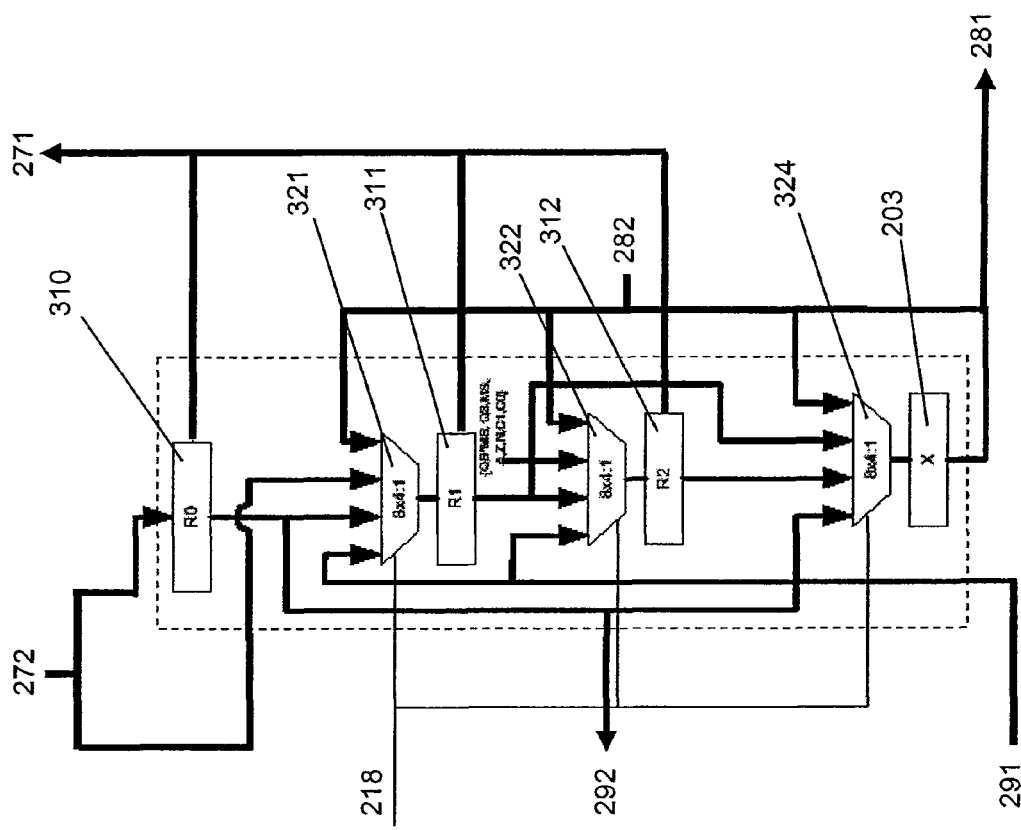
FIG. 3 shows one embodiment of the components and interconnections of a register pipe of the present invention.

Referring to FIG. 3, the components of the result pipe 201 are shown. The result pipe comprises result registers 202 (first, second and third result registers 310, 311, 312) and the neighbourhood connection register 203. At the input to each of the result registers 202 are first, second and third selection circuits 320, 321, 322 connected to the first, second and third result registers 310, 311, 312 respectively. There is a neighbourhood connection register selection circuit 324 connected at the input to the neighbourhood connection register 203. The selection circuits each select one of four inputs applied to them for a given configuration of control signals 218 and may comprise 8-bit 4:1 multiplexers, as shown.

The inputs to and outputs from each of the selection circuits are given in Table 1 below:

TABLE 1

Result and neighbourhood connection register inputs/outputs

| Register | Inputs | | | | Outputs |
|---|---|---|---|---|---|
| | 0 | 1 | 2 | 3 | |
| R0 | PL0 | PL1 | | | RF, X, PL |
| R1 | R0 | X | RF | PL2 | R2, R3, PL |
| R2 | R1 | X | RF | PL3 | X, PL |
| X | R2 | R1 | R0 | IL | OL, R1, R2, X | where:
- RO refers to the first result register 310;
- R1 refers to the second result register 311;
- R2 refers to the third result register 312;
- X refers to the neighbourhood connection register 203;
- RF refers to the register file 208;
- PL refers to the processing logic 204;
- IL refers to the input logic 206;
- OL refers to the output logic 208; and
- PL1, PI-2 and PL3 refer to different portions of the processing logic from which data can be received.

As can be seen in FIG. 3 and from Table 1, the only input to the register file 208 is from the first result register 310.

As mentioned above, data can be input into the result registers 202 from different portions of the processing logic 204. Such portions include an arithmetic logic unit PL0, a corresponding logical unit PL1, shift control registers PL2 and condition registers PL3. Generally data could be output from each of the result registers 202 to the data shifting blocks (mentioned above).

The use of the selection circuits 321, 322, 324 allows the result and neighbourhood connection registers 202, 203 to be chained together in different configurations.

Possible configurations are:
- R0→R1→R2→X
- R0→X→R1→R2,
- R0→R1→X→R2,
- R0→X→R2, where '→' means 'outputs to'.

Thus, data can be input to the neighbourhood connection register 203 from neighbouring processing elements 250, the configuration of the chain can be changed so that the neighbourhood connection register 203 is moved to a different location and the data therein output to the second or third result register 310, 311, 312 having a desired output destination (i.e. a desired portion of the processing logic or register file).

The chain also allows pipelining of data to take place in the processing logic 204 and between the processing logic 204 and the register file 208. As will be appreciated, the results of some processing operations are available before results from other processing operations. Using the flexible results pipeline described, the results of processing operations can be extracted from a given portion of the processing logic 204 before results from other portions. This extracted data can then be output from the result pipe 201, either to the register file 208 or to the output logic 208 so that it can be output from the processing element 200 before the results from the other portions are available. In addition, the chain allows one or more results of a first processing operations which are available before the entire first operations has completed to be fed back into the processing logic 204 to be used in a second operation whilst the first operation completes. Moreover, it allows results to be delayed whilst other results or data with which they are to be combined are made available.

In conclusion, the present invention allows data processing in processing elements in a parallel processor to occur at a higher rate. Data can be processed and output at a higher rate from the processing elements since pipelining can occur. The flexible positioning of the neighbourhood connection register 203 within the result pipe 201 helps facilitate this.

It will of course be understood that the present invention has been described above purely by way of example and modifications of detail can be made within the scope of the invention.

The invention claimed is:

1. An active memory, comprising:
a memory device; and
a processing element array including a plurality of processing elements arranged in rows and columns, each of the processing elements comprising:
processing logic having an input port configured to receive data to be processed and an output port configured to transmit processed data;
a results pipe, comprising:
a results register coupled to the input port and the output port of the processing logic, the results register being configured to store processed data received from the processing logic and to store data that is to be provided to the processing logic to be processed;
a neighborhood connection register coupled to the results register, the memory device and the neighborhood connection register of at least one of the other processing elements in the processing element array, the neighborhood connection register configured to both provide data to each processing element that is adjacent the processing element and to receive data from each processing element that is adjacent the processing element; and
control logic coupled to the processing logic and the results pipe, the results pipe being configured to control the operation of the processing logic and the results pipe to allow data to be shifted through the processing element array in any direction.

2. The active memory of claim 1 wherein the neighborhood connection register is configured to be responsive to a signal from the control logic to selectively configure the result registers.

3. The active memory of claim 1 wherein each of the processing elements further comprise a register file coupled to the memory device and the results pipe of the respective processing element, the register file being configured to couple data between the results pipe and the memory device.

4. The active memory of claim 3 wherein each of the processing elements further comprise a memory interface coupled to the memory device and the register file of the respective processing element, the memory interface being configured to couple data between the register file and the memory device.

5. The active memory of claim 1 wherein each of the processing elements further comprise output logic coupled to the result register of the respective processing element and the processing logic of at least one of the other processing elements in the processing element array.

6. The active memory of claim 5 wherein the output logic is configured to combine data from the processing logic of the respective processing element with data received from other processing elements, and to couple the combined data to the processing logic of at least one of the other processing elements in the processing element array.

7. The active memory of claim 1 wherein the processing logic comprises an arithmetic and logic unit.

8. The active memory of claim 7 wherein the processing logic further comprises at least one condition register.

9. The active memory of claim 7 wherein the processing logic further comprises at least one data shifting block.

10. The active memory of claim 7 wherein the processing logic further comprises a plurality of shift control registers.

11. The active memory of claim 1 wherein the memory device comprises a dynamic random access memory device.

12. An active memory, comprising:
a memory device; and
a processing element array including a plurality of processing elements arranged in rows and columns, each of the processing elements comprising:
processing logic configured to process received data and to transmit processed data;
a plurality of results registers coupled to the processing logic, each of the results registers being configured to store data received through a respective input port and to output the stored data through a respective output port;
a plurality of selection circuits each of which has a plurality of input ports coupled to a respective one of the output ports of a plurality of the results registers and an output port coupled to a respective one of the input ports of a plurality of the results registers, each of the selection circuits being configured to couple its output port to one of its input ports responsive to a respective control signal;
a neighborhood connection register having an input port coupled to the output port of at least one of the plurality of selection circuits and to each neighboring processing element in the processing element array, the neighborhood connection register further having an output port coupled to the input port of at least one of the plurality of selection circuits and to each neighboring processing element in the processing element array; and
control logic coupled to the selection circuits, the control logic being configured to apply respective control signals to the selection circuits.

13. The active memory of claim 12 wherein the control signals from the control logic are configured to cause the results registers to be coupled to each other in a plurality of different orders.

14. The active memory of claim 12 wherein each of the processing elements further comprise a register file coupled to the memory device and a respective one of the input ports of each of the plurality of selection circuits, the register file being configured to couple data between the selection circuits and the memory device.

15. The active memory of claim 12 wherein each of the processing elements further comprise a memory interface coupled to the memory device and the register file of the respective processing element, the memory interface being configured to couple data between the register file and the memory device.

16. The active memory of claim 12 wherein each of the processing elements further comprise output logic coupled to the output port of the neighborhood connection register and the processing logic of at least one of the other processing elements in the processing element array, the output logic being configured to coupled data from the neighborhood connection register to the other processing element.

17. The active memory of claim 16 wherein the output logic is configured to combine data from the neighborhood connection register of the respective processing element with data received from other processing elements, and to couple the combined data to the processing logic of at least one of the other processing elements in the processing element array.

18. The active memory of claim 12 wherein each of the plurality of selection circuits comprises a respective multiplexer.

* * * * *